(12) United States Patent
Hansen et al.

(10) Patent No.: US 8,957,552 B2
(45) Date of Patent: Feb. 17, 2015

(54) CAN OF A DRIVE MOTOR FOR A PUMP ASSEMBLY

(75) Inventors: Jørn Toftegaard Hansen, Silkeborg (DK); Tom Eklundh Larsen, Ulstrup (DK); Finn Mathiesen HøJ, Aarhuis N (DK)

(73) Assignee: Grundfos Management a/s, Bjerringbro (DK)

( * ) Notice: Subject to any disclaimer, the term of this patent is extended or adjusted under 35 U.S.C. 154(b) by 787 days.

(21) Appl. No.: 12/679,209

(22) PCT Filed: Sep. 12, 2008

(86) PCT No.: PCT/EP2008/007507
§ 371 (c)(1),
(2), (4) Date: Jul. 15, 2010

(87) PCT Pub. No.: WO2009/039967
PCT Pub. Date: Apr. 2, 2009

(65) Prior Publication Data
US 2010/0308672 A1    Dec. 9, 2010

(30) Foreign Application Priority Data

Sep. 21, 2007    (EP) ..................................... 07018590

(51) Int. Cl.
*H02K 5/02*    (2006.01)
*B29C 45/00*    (2006.01)
(Continued)

(52) U.S. Cl.
CPC .............. *H02K 5/02* (2013.01); *B29C 45/0005* (2013.01); *B29C 45/14631* (2013.01);
(Continued)

(58) Field of Classification Search
CPC ......... H02K 5/08; H02K 15/12; H02K 5/225; H02K 5/02; B29C 45/14631; B29C 45/5605; B29C 45/1418; F04D 13/06; F04D 13/0626; F04D 13/0633
USPC ............... 310/43, 87, 88; 264/40.5, 277, 312, 264/478, 328.12; 29/596; 417/423.14
IPC .................................... H02K 5/02; B29C 45/14
See application file for complete search history.

(56) References Cited

U.S. PATENT DOCUMENTS 4,288,478 A * 9/1981 Kinoshita et al. .......... 428/36.92
5,571,583 A * 11/1996 Cao et al. ..................... 428/35.7
(Continued)

FOREIGN PATENT DOCUMENTS

CN            1213528 C       8/2005
DE         35 10 626 A1      10/1986
(Continued)

OTHER PUBLICATIONS

European opposition proceeding documents dated Jun. 8, 2011 in EP Patent No. 2 040 354 B1.
(Continued)

*Primary Examiner* — John K Kim
(74) *Attorney, Agent, or Firm* — Panitch Schwarze Belisario & Nadel LLP

(57) ABSTRACT

A can of a drive motor is provided for a pump assembly, wherein the can (22) is manufactured at least partly of plastic (52). At least in a part of the can (22) the plastic (52) is reinforced by individual fibers (32) distributed in the plastic (52). The fibers (32) in at least one layer (35) of the can (32) are aligned in a defined manner in the peripheral direction with respect to the longitudinal axis (Z) of the can (22). A method for manufacturing such a can is also provided.

13 Claims, 12 Drawing Sheets

(51) Int. Cl.
*B29C 45/14* (2006.01)
*B29C 45/56* (2006.01)
*H02K 5/128* (2006.01)
*H02K 15/14* (2006.01)
*F04D 13/06* (2006.01)
*B29C 70/48* (2006.01)

(52) U.S. Cl.
CPC .......... *B29C 45/5605* (2013.01); *H02K 5/128* (2013.01); *H02K 15/14* (2013.01); *F04D 13/0626* (2013.01); *F04D 13/0633* (2013.01); *B29C 70/48* (2013.01); *B29C 45/1418* (2013.01); *B29C 45/14786* (2013.01)
USPC ............... 310/43; 310/87; 310/88; 264/40.5; 264/277; 264/312; 264/328.12; 264/478; 29/596; 417/423.14

(56) References Cited

U.S. PATENT DOCUMENTS

| | | | |
|---|---|---|---|
| 5,753,159 A * | 5/1998 | Cao et al. | 264/312 |
| 6,274,075 B1 * | 8/2001 | Gellert et al. | 264/255 |
| 6,365,998 B1 * | 4/2002 | Kech et al. | 310/194 |
| 6,445,098 B1 | 9/2002 | Materne | |
| 6,919,659 B2 | 7/2005 | Rapp | |
| 2001/0030475 A1 * | 10/2001 | Kliman et al. | 310/89 |
| 2004/0145095 A1 * | 7/2004 | McCollum et al. | 264/544 |
| 2004/0184936 A1 * | 9/2004 | Yanagihara et al. | 417/420 |
| 2005/0287320 A1 * | 12/2005 | Dalton et al. | 428/34.1 |
| 2008/0029929 A1 * | 2/2008 | Hutchinson et al. | 264/241 |
| 2010/0308672 A1 * | 12/2010 | Hansen et al. | 310/43 |
| 2013/0221769 A1 * | 8/2013 | Hansen et al. | 310/43 |

FOREIGN PATENT DOCUMENTS

| | | |
|---|---|---|
| EP | 0 349 674 A2 | 1/1990 |
| EP | 1024584 A2 | 8/2000 |
| EP | 1 059 722 A1 | 12/2000 |
| EP | 1703135 A2 | 9/2006 |
| WO | 01/84690 A2 | 11/2001 |

OTHER PUBLICATIONS

Johannaber et al, "Handbuch Spritzgießen" (Injection Molding Handbook), 2nd Ed., Carl Hanser Publishing, pp. 386-389 (2004).

"Faserverstärkung richtig simulieren," (Fiber Reinforcement Correct Simulating) Kunststoffe, Carl Hanser Publishing, pp. 94-99 (May 2004).

Meddad et al, "Weldline Strength in Glass Fiber Reinforced Polyamide 66," Polymer Engineering and Science, vol. 35, No. 11, pp. 893-901 (1995).

Office Action issued Feb. 16, 2012 in CN Application No. 200880108088.1.

* cited by examiner

CAN OF A DRIVE MOTOR FOR A PUMP ASSEMBLY

CROSS-REFERENCE TO RELATED APPLICATIONS

This application is a Section 371 of International Application No. PCT/EP2008/007507, filed Sep. 12, 2008, which was published in the German language on Apr. 2, 2009, under International Publication No. WO 2009/039967 A1 and the disclosure of which is incorporated herein by reference.

BACKGROUND OF THE INVENTION

The invention relates to a can of a drive motor for a pump assembly, as well as to a method for the manufacture of such a can. Such a pump assembly may for example be a heating circulation pump assembly.

The drive motors of such pump assemblies are designed as wet-runners, wherein a can is arranged between the stator space and the rotor space, and this separates the fluid filled rotor space from the dry stator space. Until now, such cans have mostly been manufactured of metal. This however has the disadvantage that they compromise the magnetic field between the stator and the rotor. For this reason, it is preferable to apply electrically non-conducting cans, for example cans of plastic. With the cans of plastic however, there exists the problem of ensuring the desired pressure strength, given larger pump pressures. For this, the can must have a certain minimum thickness. However, the distance between the rotor and the stator increases with an increasing thickness of the can in the radial direction, whereby the efficiency of the drive motor is worsened.

BRIEF SUMMARY OF THE INVENTION

It is therefore the object of the invention to improve a can of a drive motor, in a manner such that, on the one hand, it may be designed such that it influences the magnetic field between the rotor and stator as little as possible and, on the other hand, it may be designed more thinly, in order to be able to reduce the distance between the rotor and the stator.

This object is achieved by a can of a drive motor for a pump assembly, wherein the can is manufactured at least partly of plastic, characterized in that the plastic at least in a part of the can is reinforced by individual fibers distributed in the plastic, wherein the fibers in at least one layer of the can are aligned in a defined manner in the peripheral direction with respect to the longitudinal axis (Z) of the can.

This object is also achieved by a method for manufacturing a can of a drive motor for a pump assembly, characterized in that fluid plastic, to which individual fibers are admixed for reinforcement, is introduced into an injection molding tool which defines the shape of the can to be manufactured, wherein an inner mold part of the injection molding tool is rotated relative to an outer mold part of the injection molding tool, during the introduction and/or after the introduction of the plastic.

The stator according to the invention is manufactured at least partly of plastic. Thereby, the plastic preferably forms the supporting material, i.e. the material ensuring the mechanical strength of the can. Reinforcing elements, in particular fibers, may be provided in the plastic and these fibers may also be manufactured of plastic, but also of other suitable materials. Thus, a plastic composite material may be applied as the plastic. Furthermore, preferably a metallic layer may be attached on the inner side or outer side of the can, in order to design the can in a hermetically tight manner.

According to the invention, the plastic is reinforced by individual fibers distributed in the plastic, at least in a part of the can. With regard to these individual fibers, it is the case of fibers which are randomly distributed in the plastic and are not connected to one another into a fabric. These fibers may be admixed to the plastic before its processing, i.e. before the injection molding, so that a mixture of plastic and fibers is processed in the injection mold, i.e. is brought into the shape of the can. If the fibers are also randomly, preferably uniformly distributed in the whole plastic, then this does not mean that they are also directed in a random manner. Rather, according to the invention, the fibers are aligned in a defined manner in the peripheral direction with respect to the longitudinal axis of the stator, in at least one layer of the can. Thus in this layer, the individual fibers extend in the peripheral direction or tangentially to the longitudinal axis of the stator. This is particularly the case in a region of the can which is designed essentially cylindrically about the longitudinal axis of the can. In this region, the peripheral alignment of the fibers has the advantage that the can is reinforced by the fibers, thus particularly in the peripheral direction. In this direction, the fibers may counteract a pressure acting in the inside of the can, i.e. give the material the required tensile strength in this direction, in order to withstand such a pressure. It is possible for the fibers to be aligned in a defined manner in the peripheral direction in the described manner over the whole thickness of the can in the radial direction. However, it is also possible for the can to be designed in a multi-layered manner, seen in the radial direction, and for the alignment of the fibers in the described manner to only be given in one or a few of several layers. The fibers in the other layers may either be aligned in a defined manner in another direction, or however aligned in a random manner.

A greater strength of the can with a reduced wall thickness is achieved by the alignment of the fibers.

The fibers may for example be carbon fibers, glass fibers, metal fibers or aramide fibers, but also natural fibers, such as hemp, cotton or silk, for example.

The plastic of the can preferably comprises at least two layers which border one another, wherein the fibers are aligned in the peripheral direction in one layer, and the fibers are aligned in the axial direction with respect to the longitudinal axis of the can in the second adjacent layer. These two layers are formed lying over one another and bordering one another, seen in the radial direction. These layers in the cylindrical section of the can thus likewise extend lying over one another in a cylindrical shape. If the can is designed in a pot-like manner, i.e. with a closed base at one axial end, then there, according to the invention, the fibers may extend in the peripheral direction in at least one layer. In the case that several layers are provided, the fibers in the base may extend in the radial direction in at least one further layer. This is then the layer in which the fibers extend in the axial direction in the peripheral section of the can. A reinforcement of the can may be achieved in the axial as well as in the peripheral direction, or in the base in the peripheral direction as well as in the radial direction, on account of the crossed alignment of the fibers in two layers adjacent one another created by this.

Further preferably, the plastic comprises at least three layers, wherein the fibers in a middle layer are aligned in the peripheral direction, and the fibers in the adjacent outer layers are aligned in the axial direction in the previously described manner. In the case that the can has a base, then there, the fibers are accordingly aligned in the radial direction in two outer layers and the fibers are aligned in the peripheral direction in the layer lying therebetween. Thereby, the outer layers preferably form edge layers and have a smaller layer thickness than the middle layer. A greater reinforcement in the peripheral direction is achieved by this.

According to a further preferred embodiment, the can is designed in an open manner at least one axial end, and there has a radially outwardly directed collar, wherein the fibers in the collar are aligned radially to the longitudinal axis in at least one layer of the plastic. The can may be fastened with this collar at a later stage in the stator housing or brought into sealing contact with the stator housing, in order to seal the stator space with respect to the rotor space. The collar is reinforced in the radial direction on account of the radial alignment of the fibers in this collar, so that forces may be transmitted or accommodated, in particular in this direction. Alternatively or additionally, it is possible to align the fibers tangentially or peripherally in a part or a layer of the collar.

According to a further particular embodiment of the invention, the can comprises an outer ply of a prestressed material, and an inner ply which is formed of the plastic which is reinforced by individual fibers distributed in the plastic, wherein the fibers, in the previously described manner, are aligned in a defined manner in the peripheral direction with respect to the longitudinal axis of the stator, in at least one layer of the inner ply. The outer ply of the prestressed material ensures an additional strength of the can, even with small wall thicknesses. A peripheral tensile stress, but, as the case may be, also an axial tensile stress, may be produced in particular in the cylindrical section of the can, by the outer ply, which leads to compressive stresses in the inner ply and to a radially inwardly directed pressure force acting on the inner ply. A detachment of the outer and inner ply from one another is prevented by this arrangement. Furthermore, this pressure force counteracts fluid pressure acting onto the can from the inside. Fractures in the inner ply may be prevented by the prestressing of the outer ply, and thus the sealing of the can may be improved.

The prestressing of the material may be achieved by it being the case of an elastically extendible material which is extended before, or when injecting the plastic of the inner ply. Since the material after the extension tends to assume the initial position again, on account of its elasticity, the desired stresses occur in the material after connection to the inner ply. With an adequately large extension, these stresses may also be maintained when the material of the inner ply shrinks due to cooling. For this, the extension of the material of the outer ply before or when injecting the plastic material of the inner ply, is selected such that the extension has a greater extent than the shrinkage of the plastic material of the inner ply when this plastic material solidifies. A prestressing of the material of the outer ply may also be maintained after the solidification of the plastic of the inner ply by this.

One may manufacture a particularly strong and simultaneously particularly thin can by a combination of the alignment of the fibers in the plastic of the inner ply in the described manner, and the arrangement of a prestressed outer ply.

According to a further preferred embodiment, a bearing which is provided for mounting a rotor, or a bearing holder which is provided for receiving a bearing for mounting the rotor, is cast in the plastic of the can. The assembly of a pump assembly may be simplified in this manner, since the bearing or a bearing holder for receiving the bearing, may be positioned and fixed in the can in a defined manner directly on manufacture of the can.

The bearing and the bearing holder are preferably manufactured of a material which has a greater hardness and/or stiffness than the plastic of the can, and in particular of metal. Thus the bearing and the bearing holder may have the required strength, in order to ensure a wear-free mounting.

Further preferably, the at least one surface of the bearing or of the bearing holder, which is in contact with the plastic of the can, is provided with a surface structuring, in particular with a macro-structuring or micro-structuring. This structuring permits an improved contact or engagement with the plastic. Ideally, a positive-fit connection between the plastic and the bearing or the bearing holder may be achieved by the plastic engaging into the structuring on the surface. A better adhesion of the plastic material on the surface may be achieved by a suitable roughening. The structuring may either be designed in a very small manner as a micro-structuring, or be designed larger as a macro-structuring. Such a macro-structuring may for example be achieved by a conical design of the bearing or in another manner by forming undercuts. Thus, parts of the bearing or the bearing holder are designed such that the plastic may engage behind them.

In particular, projections, recesses and/or holes may be incorporated into the surface. The structuring may be incorporated for example in a material-removing manner. It is also possible the treat the surface by laser beam or electron beam, in a manner such that recesses and raised parts are formed, which lead to a cramping with the surrounding plastic.

According to a preferred embodiment, grooves or channels are formed in the bearing or the bearing holder, and extend parallel to the longitudinal axis of the can over the axial length of the bearing or the bearing holder. These grooves serve the peripheral flushing of the bearing or bearing holder by the fluid in the inside of the can. By this, on the one hand one succeeds in all components being held at the same temperature level by the peripherally flowing fluid, in order to avoid thermal stresses. On the other hand, the bearing may be cooled by the peripherally flowing fluid. As the case may be, the fluid may also be used for the lubrication of the bearing.

The invention further relates to a method for the manufacture of a can of a drive motor for a pump assembly, in particular for manufacturing a can according to the preceding description.

According to the method according to the invention, at least one part of the can is manufactured of plastic with the injection molding method, wherein individual fibers for reinforcing, are admixed to the plastic before the injection molding. The fibers thereby are preferably uniformly distributed in the plastic material. Subsequently, the fluid plastic with the fibers distributed therein, is brought or injected into an injection molding tool. The injection molding tool defines the shape of the can to be manufactured. An inner mold part of the injection molding tool is rotated relative to an outer mold part of the injection molding tool during the introduction and/or after the introduction of the plastic. Thereby, the rotation takes place about the longitudinal axis of the can to be molded. It is possible to start the rotation already during the injection of the plastic. It is also possible to start the rotation not until after the injection of the plastic, i.e. preferably directly after the injection. The rotation between the outer and inner mold part thereby takes place in a time interval, in which the plastic has at least not yet fully solidified. A defined alignment of the fibers in the plastic may be achieved by the rotation of the inner and outer shape part relative to one another. Thereby, an alignment in the rotation direction, i.e. in the peripheral direction or tangentially with respect to the longitudinal axis of the can, is achieved by the rotation. An increased tensile strength of the plastic is effected in this direction on account of this alignment of the fibers. As a whole, a strong and simultaneously thin can may be designed by this. The previous description is referred to with regard to the advantages of this design.

Depending on the course and the control of the injection molding procedure and of the rotation between the outer and inner mold part, it is possible to orient the fibers in the plastic in a defined manner in the peripheral direction, and in the mentioned manner, over the whole radial thickness, but also to generate different layers in which the fibers are directed in different directions. This means that of the several layers which lie over one another in the radial direction, it is possible for the fibers to be aligned in the peripheral direction by the rotation in only one or individual layers.

The fluid plastic preferably flows in the axial direction parallel to the longitudinal axis of the can to be manufactured, into the part of the injection molding tool which shapes or defines the peripheral wall of the can. This may be achieved by the plastic being injected from the axial end. It is however also possible to inject the plastic in the middle of the can, so that it flows in the axial direction in opposite directions. First, a corresponding axial alignment of the individual fibers admixed to the plastic may be achieved on account of the axial inflow of the plastic.

On account of the described relative rotation from the inner to the outer mold part, one may subsequently succeed in a part or all fibers changing their orientation from the axial alignment into a peripheral or tangential alignment with respect to the longitudinal axis of the can. It is possible, depending on the setting of the method parameters, for several layers to be formed in the injected plastic on solidification, which differ with regard to the orientation of the fibers. In particular, it is possible to form at least one layer which bears on the wall of a mold part, and in which the fibers remain aligned in the axial direction when the plastic solidifies. This is effected in that the plastic solidifies first of all in the edge region of the gap between the inner and the outer mold part, i.e. adjacent a wall of a mold part. The plastic remains fluid or flowable longer in the regions of the mold which are spaced further from the walls of the mold part, so that here an alignment of the fibers in the peripheral direction may occur by the rotation of the mold parts to one another. In this manner, preferably a second layer solidifying later is formed, in which the fibers are aligned in the peripheral direction. A targeted reinforcement of the can may be achieved in several directions by the fibers on account of the different alignment of the fibers in the different layers. Thereby, in contrast to randomly aligned fibers, one achieves a targeted strengthening of the can, which in particular ensures a thin design of the can having a stability which remains the same or is increased.

According to one particular embodiment, a three-layered construction of the plastic material may be achieved, with which the axial alignment of the fibers is achieved by the injection procedure and is retained on solidification, in the two edge regions which are situated to the outside and face the two mold parts. A peripheral orientation of the fibers in the middle region lying therebetween is effected by the rotation of the mold parts to one another. The middle region thereby preferably has a larger thickness in the radial direction than the edge regions, so that the reinforcement in the peripheral region is larger than in the axial direction. The middle region preferably has a thickness of 40% or more, preferably more than 60% of the total thickness of the plastic in the radial direction.

According to a further preferred embodiment, a bearing or bearing holder is applied into the injection molding tool in a defined position, before the fluid plastic is introduced into the injection molding tool. With the subsequent injection of the plastic, this then flows around the bearing or bearing holder, so that the bearing or the bearing holder is cast firmly into the can.

Preferably, the bearing or the bearing holder is applied in a recess in the injection molding tool, in particular on the inner mold part of the injection molding tool. The recess thereby is arranged and designed, such that the bearing is held in the mold in a defined position, so that afterwards, it is enclosed and held in a defined position in the plastic in the cast can.

It is preferable for the bearing or the bearing holder to be inserted in a recess on the inner mold part, and there, to be held bearing on at least one surface of the mold part by the pressure of the plastic during the introduction of the fluid plastic. In this manner, it is ensured that the bearing may not be dislocated out of the defined position. Furthermore, a non-positive fit between the bearing and mold part may be achieved, so that on rotation of the mold part for example, the bearing or the bearing holder which is in a non-positive fit bearing with the mold part, is rotated about the longitudinal axis of the can to be manufactured. A further advantage of the bearing on the surface is that a sealing bearing may be achieved, whereby one prevents the plastic entering into the region between the bearing or bearing holder, and the surface of the mold part.

Usefully, before the insertion into the injection molding tool, a structuring, in particular a micro-structuring and/or macro-structuring is formed on at least one surface of the bearing or bearing holder, which is envisaged to come into contact with the plastic. This structuring may be effected in the manner described above with regard to the can.

According to a particular embodiment of the method according to the invention, a pre-manufactured material ply is applied into the injection molding tool before the introduction of the fluid plastic, wherein the fluid plastic is subsequently preferably introduced between the inner mold part of the injection molding tool and the pre-manufactured material ply. This means that the material ply is applied into the injection molding tool before the closure of the injection molding tool, so that the material ply is then firmly connected to the injected plastic material after the injection of the fluid plastic and its solidification. This material ply preferably forms the outer material ply of the can to be manufactured, which is why the plastic is injected into the space between the material ply and the inner mold part. This material ply may form an additional reinforcing element, for example of fibers. It is preferably the case of a fabric. Thermoplastic fibers, carbon fibers, metal fibers and/or aramide fibers or other suitable fibers may be applied as fibers for example. Moreover, natural fibers such as hemp, cotton or silk may be applied as fibers.

Particularly preferably, the pre-manufactured material ply is elastically extendible and is extended when introducing the plastic. In this manner, a prestressing of the outer material ply may be achieved in the solidified condition of the plastic. This stress in the outer material ply effects an inwardly directed pressure force, which keeps the outer ply in firm contact with the inner ply. This leads to an increased strength of the can. The above description is referred to with regard to further advantages.

The extension of the outer material ply on injection of the plastic is preferably so great, that the extension exceeds the later shrinkage of the plastic on its solidification. In this manner, an extension of the outer material ply is also maintained in the solidified condition of the can, whereby the mentioned prestressing results.

A part of the injection molding tool may be heated according to a further preferred embodiment. This may for example be the outer and/or inner mold part. The edge layers of the plastic which are adjacent to the respective mold part, may be heated or cooled more slowly by heating the mold parts, so that the solidification of these edge layers may be delayed. In this manner, it is possible to orientate the fibers in the peripheral direction by rotation of the form parts to one another, also in the edge sections. It is thus possible to orientate the fibers in the peripheral direction in the complete plastic material, seen in the radial thickness direction. It is also possible to merely form one edge layer, in which the fibers are orientated in the axial direction, as was described above.

According to further special embodiment of the method, the injection molding tool, in which the can is formed, comprises a gap which is designed for forming a radially extending collar at the open end of the can to be manufactured. During the solidification of the plastic, which is injected into the injection molding tool and thus is also injected into this gap, a pressure is exerted on at least one of the walls of the injection molding tool which defines this gap, wherein this pressure is directed towards the opposite wall of the gap. I.e. the gap is narrowed in its width by moving the walls apart. For this, the tool preferably has a base plate which lies opposite the outer mold part. This base plate is distanced to the outer mold part, in order to define the gap for forming the collar. The base plate during the solidification is moved onto the outer mold part, so that the gap is reduced in size. This method is particularly advantageous, if the gap has a larger width than the gap between the outer and inner mold part which defines the peripheral wall of the can to be manufactured. It is possible in this manner to manufacture a can with a very thin peripheral wall, which despite this has a collar of a larger material thickness at its open face-end. By applying a pressure force onto the wall of the gap forming the collar or by reducing the gap width during the solidification, one prevents bubbles (blowholes) or similar cavities from being able to form in this region on account of the shrinkage of the plastic on solidification.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
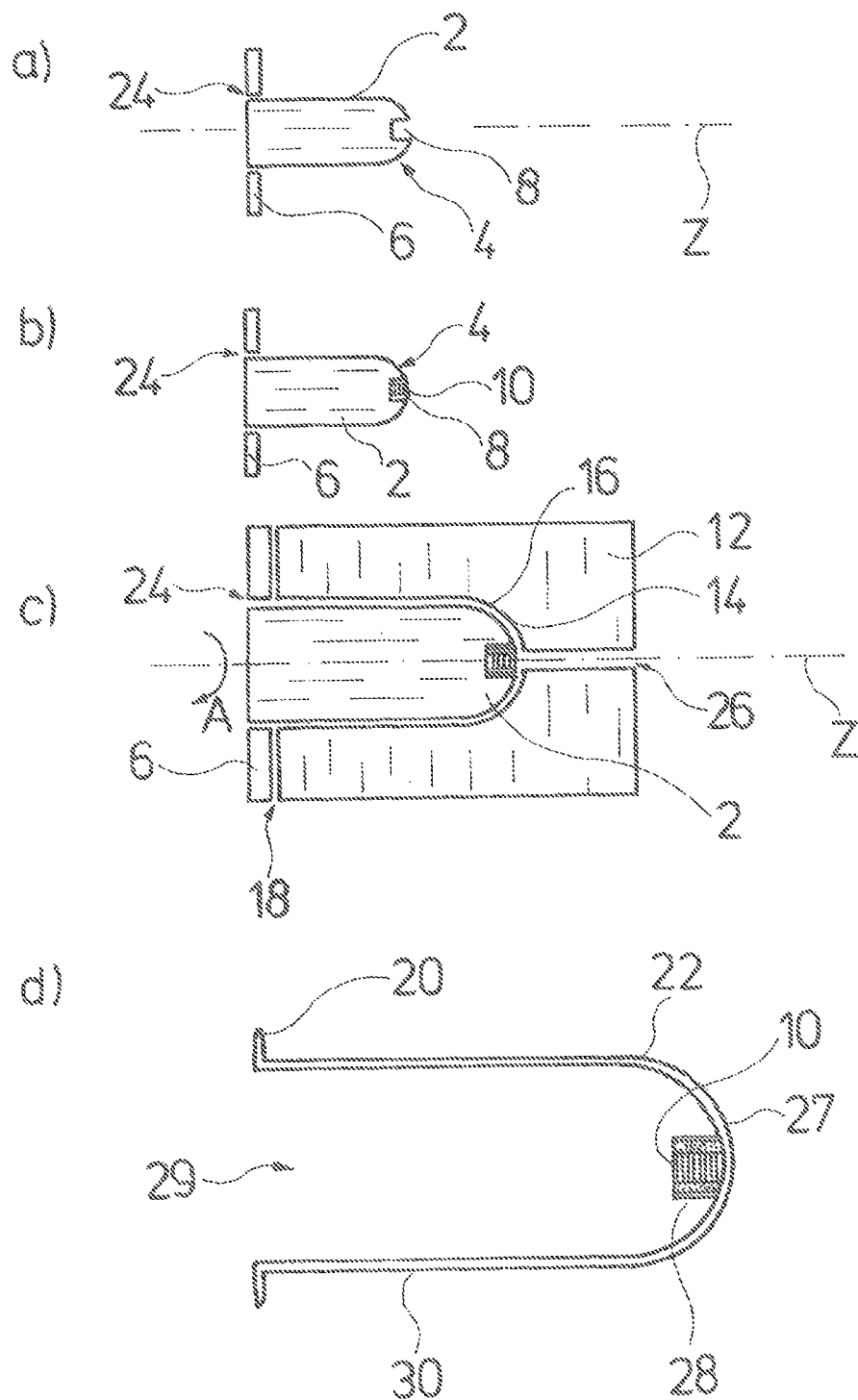
FIGS. 1a to 1d are schematic diagrams of the injection molding procedure of a can, according to the invention.

First, in a stepwise manner, the manufacture of a can according to the invention is explained by the FIGS. 1a to 1d. FIG. 1a schematically shows an inner mold part 2 or a core 2 of an injection molding tool for the manufacture of a can. The inner mold part 2 defines the shape of the inner space of the can to be manufactured. Thereby, a first axial end-side 4 defines the inner side of a base of a can to be manufactured. Such a can is designed closed by a base at one axial end, i.e. in a pot-like manner. The opposite axial end of the can is designed in an open manner and is the axial end which is later applied onto a pump housing. The inner mold part 2 at its end distant to the end-side 4 is attached on a base plate 6, for forming this open axial end of the can. The base plate 6 extends radially outwards normally to the longitudinal axis Z of the can to be manufactured or the inner mold part 2. A central recess 8 is formed on the axial end-side 4, and serves for receiving a bearing 10 as is shown in FIG. 1d. The bearing 10 in the can later serves for mounting a rotor shaft of the rotor to be arranged in the can. Even if it is only a bearing 10 which is described, it is however to be understood that a bearing holder may be inserted into the recess 8 in an identical manner, instead of the bearing 10. A bearing is then assembled in the bearing holder.

After insertion of the bearing 10 into the recess 8, the injection molding tool is closed by an outer mold part 12. The outer mold part 12 in its inside comprises a recess 14 which defines the outer contour of the can to be manufactured. A gap 16 remains between the wall of the recess 14 in the outer mold part 12, and the outer wall of the inner mold part 2 in the closed condition of the injection molding tool, and this gap 16 corresponds to the shape of the can to be manufactured. A gap 18 also remains between the base plate 6 and the outer mold part 12, and extends annularly or in a collar-like manner, proceeding from the gap 16, in the radial direction with respect to the longitudinal axis Z. This gap serves for forming a collar 20 at the open axial end of the can 22, as is shown in FIG. 1d.

The inner mold part 2 is not firmly connected to the annular base plate 6, but is arranged in a circular recess in the base plate 6, so that an annular gap 24 remains between the base plate 6 and the inner mold part 2. The annular gap 24 serves on the one hand for bleeding the gap 16, and on the other hand for the inner mold part 2 to be able to rotate about the longitudinal axis Z in the direction of the arrow A relative to the outer mold part 12 and also the base plate 6.

A fluid plastic material is injected into an injection channel 26 in the direction of the longitudinal axis Z for injection molding the can. The injection channel 26 runs into the gap 16 in a central manner with respect to the longitudinal axis Z, opposite the axial end-side 4 of the inner mold part 2, i.e. opposite the recess 8. By this, on injecting, the fluid plastic first presses directly against the inserted bearing 10 and fixes this in the recess 8 or holds the end-side of the bearing 10 which is distant to the injection channel 26, in a sealed bearing with the base of the recess 8.

The fluid plastic subsequently flows further through the gap 16 to the annular gap 24 and the radially extending gap 18.

According to the invention, individual fibers are added to the plastic which is injected into the injection molding tool, and these fibers are preferably uniformly distributed in the plastic. The inner mold part 2 is rotated about the longitudinal axis Z in the direction of the arrow A during, or directly after the injection of the plastic, whilst the outer mold part 2 and the base plate 6 remain stationary. A special orientation of the fibers occurs due to this, as will be explained later by FIG. 2.

FIG. 1d shows the finished can 22 which is cast centrally in the base 27 of the bearing 10. The bearing 10 thereby is surrounded by a ring 28 of plastic material which preferably engages into a structuring on the surface of the bearing 10. The peripherally extending, i.e. radially outwardly extending collar 20 of the can is formed on the opposite open face-end 29.

The alignment of the fibers of the plastic which is achieved by rotation of the inner mold part 2 is now explained in more detail by FIGS. 2a to 2c.

FIG. 2a schematically shows the plan view of the base 27 of the can 22. FIG. 2b shows a section of the transition region between the base 27 and peripheral wall 30 of the can 22. FIG. 2c shows a schematic cut-out of the peripheral wall 30. Fibers 32 are arranged in a defined manner in the plastic of the wall. In the shown example, three layers 34, 35 and 36 lying over one another are formed in the plastic material seen in the radial direction with respect to the longitudinal axis Z. The layers accordingly lie over one another in the axial direction in the base 27. The layers 34 and 36 form edge layers, which face the walls of the injection molding tool. This means that the layer 34 borders the inner wall of the recess 14 in the outer mold part 12, and the layer 36 borders the outer side of the inner mold part 2. In the two outer layers 34 and 36, the fibers 32 are directed in the flow direction of the plastic material on injecting into the gap 16 in the injection molding tool. This means that proceeding from the injection channel 26, the flow direction in the base 27 is first essentially in the radial direction and, in the peripheral wall 30, in the axial direction with respect to the longitudinal axis Z. Since the edge zones 34 and 36 solidify first of all, there, the alignment of the fibers in the flow direction is retained. The solidification in the layer 35 which is distanced furthest to the walls of the inner mold part 2 and the outer mold part 12, takes place later. One succeeds in the fibers 32 in the layer 35 being orientated in the peripheral direction with respect to the longitudinal axis Z, by the rotation of the inner mold part 2 relative to the outer mold part 12. A great strength of the can may be achieved by the alignment of the fibers 32. In particular, the middle layer may be designed particularly thickly, for example may take up more than 40%, preferably more than 60% of the total thickness, so that a large part of the fibers is orientated in the peripheral direction and ensures an increased strength of the can in this direction. The edge layers 34, 36 are designed relatively thickly in the embodiment represented schematically in FIG. 2b, and the edge layers 34 and 36, as previously explained, are designed in a thin manner so that a thicker middle layer 35 arises, as is shown in FIG. 2c.

In the shown example, two edge layers 34 and 36 are provided with axially directed fibers 32. However, it is also possible to design only one or no such edge layers 34 and 36 by a suitable setting of the parameters, and in particular by heating the inner mold part 2 and/or the outer mold part 12. For this, the plastic after the injection or during the injection must first be kept flowable also in the vicinity of the walls of the injection molding tool, so that a peripheral alignment of the fibers may be achieved by rotation of the inner mold part 2 and the outer mold part 12. If for example the inner mold part 2 is heated on its surface, then a peripheral alignment of the fibers 32 may also be achieved in the layer 36. Accordingly, a peripheral alignment of the fibers 32 may also be achieved in the layer 34, if the outer mold part 12 is heated at its inner wall in the recess 14. One may also possibly do away with the heating if the rotation already takes place during the injection of the plastic.

It was previously described that the inner mold part is rotated. Accordingly, it is also possible to rotate the outer mold part 12. It is merely a question of the relative rotation of both parts.

One succeeds in the bearing 10 being rotated or turned together with the inner mold part 2 by the fact that the plastic presses against the bearing 10 on injection, and retains this with a firm bearing in the recess 8.

Figure 3:
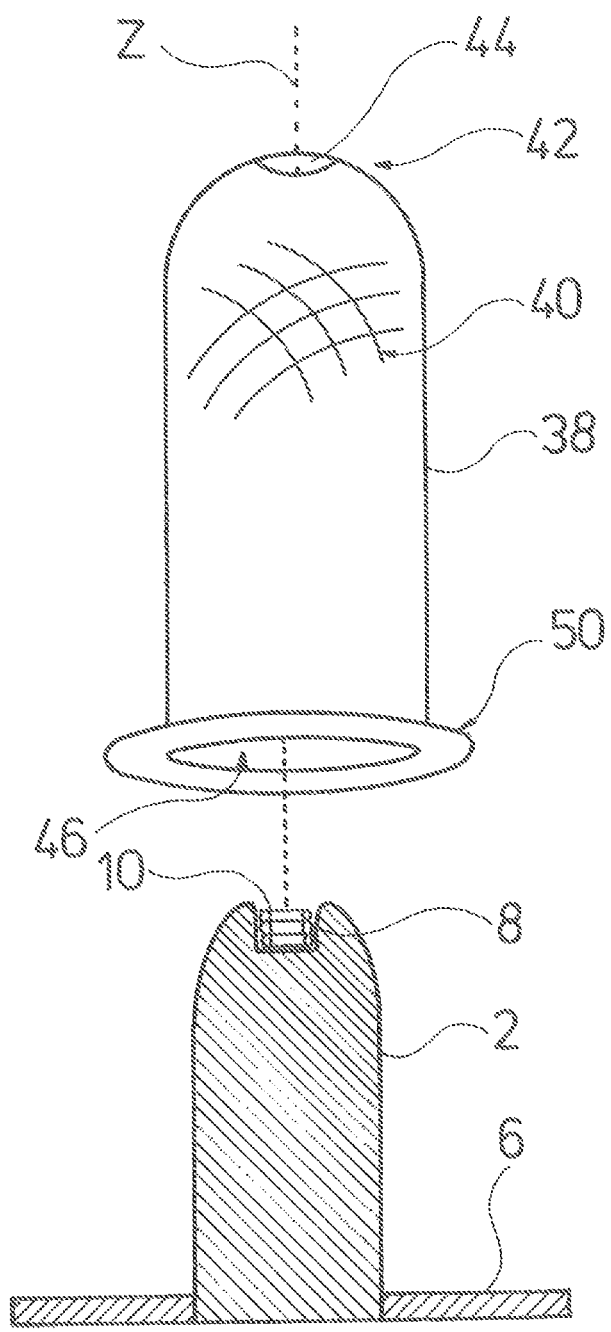
FIG. 3 is a schematic diagram of the arrangement of an outer fabric ply, on an injection molding tool.
Figure 5:
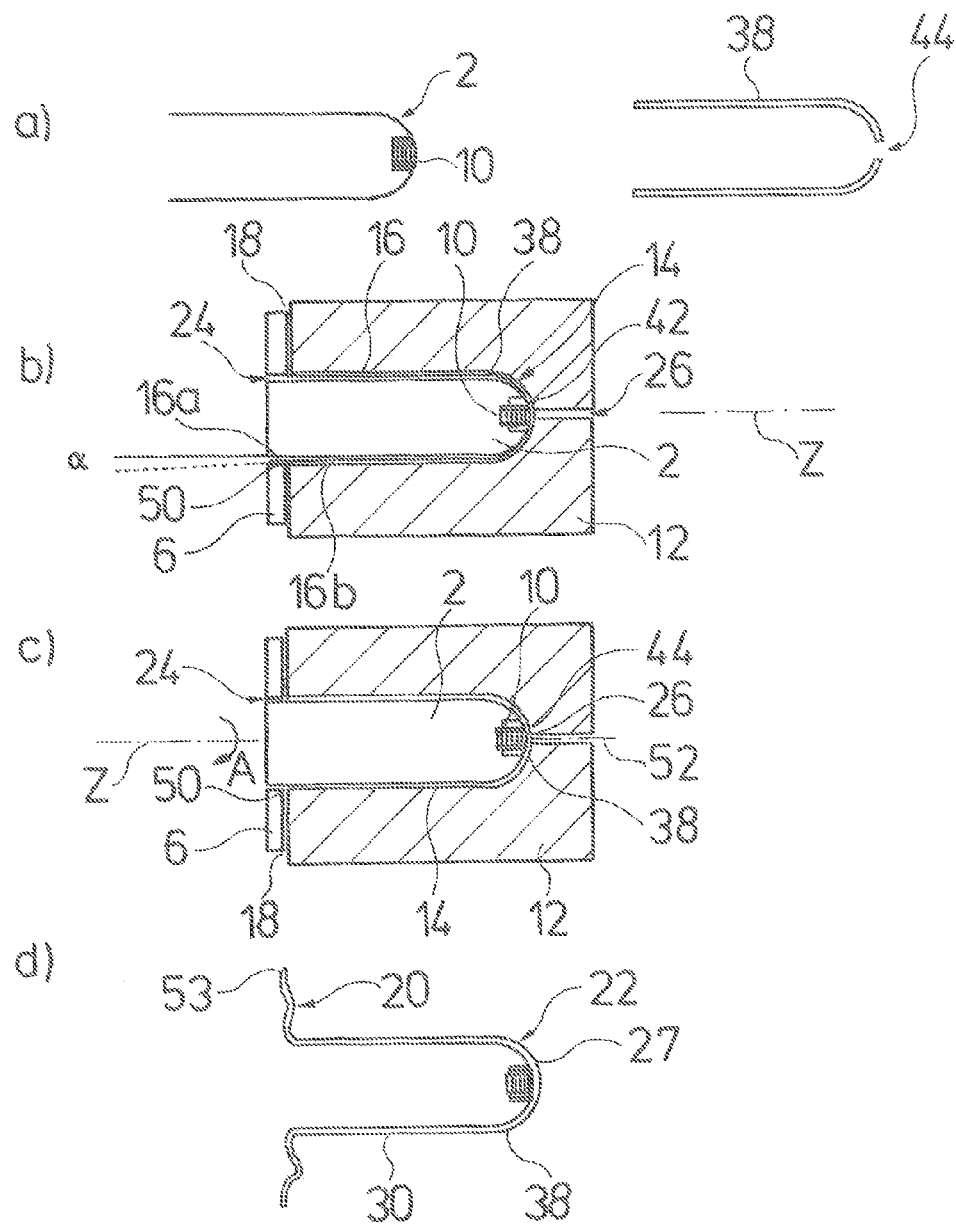
FIGS. 5a to 5d are schematic cross-sectional views of the injection molding procedure of a can, according to a second embodiment of the invention.

FIG. 3 shows the inner mold part 2 with the inserted bearing 10 and the base plate 6. It is shown in FIG. 3 how first an outer ply 38 of a woven fiber material 40 is placed onto the inner mold part 2. Thereby, the outer ply 38 already essentially has the shape of the can to be manufactured. This means that the outer ply 38 is designed in an essentially pot-like manner with a closed face-end 42. An opening 44 through which the fluid plastic is injected into the injection molding tool as will be explained later by FIG. 5, is formed centrally in the base or closed face-end 42.

The outer ply 38 at the opposite open axial end 46 comprises a radially outwardly extending collar 50 which comes to lie in the gap 18 of the injection molding tool, and later reinforces the collar 20 of the can 22. The outer ply 38 of the fabric serves for an additional reinforcement of the can. Here for example, one may apply a thermoplastic fabric, a fabric of metal fibers, aramide fibers, carbon fibers or glass fibers.

Figure 4:
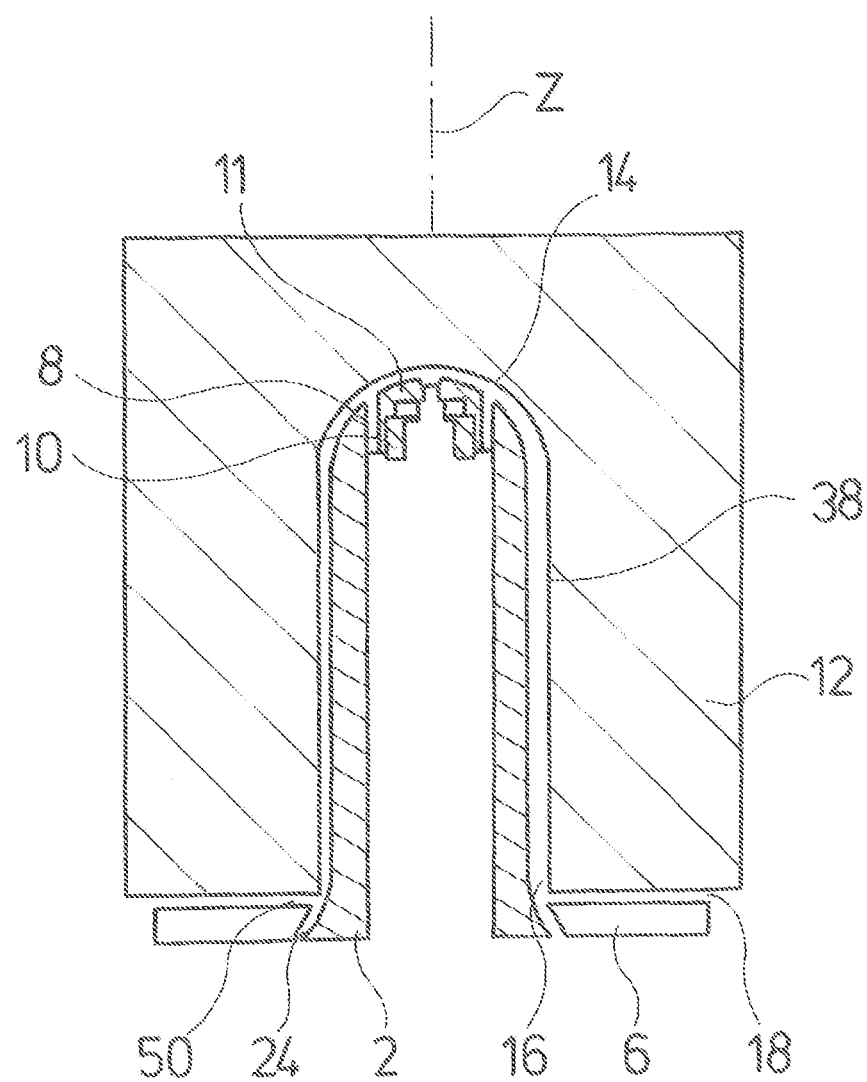
FIG. 4 is a schematic cross-sectional view of a closed injection molding tool with an inserted fabric ply.

FIG. 4 shows a sectioned view of an injection molding tool with the applied fabric ply 38 which defines the outer ply of the wall of the can. Otherwise, the injection molding tool corresponds to the injection molding tool shown in FIG. 1c. In the example shown in FIG. 4, the outer ply 38 bears directly on the inner wall of the recess 14 of the outer mold part 12. The plastic material is injected into the gap 16 between the inner mold part 2 and the outer ply 38, as is explained hereinafter by FIG. 5. This may be effected in the axial direction either through a central opening in the inner mold part 2, or also through an injection channel 26, as is shown in FIG. 1, wherein this injection channel is not shown in FIG. 4. In the case that a central opening is formed in the inner mold part 2, then the inner mold part is preferably designed of two parts, with a stationary middle part in which the opening is formed. The surrounding part of the inner mold part which faces the outer mold part 12, is arranged in a rotatable manner about this stationary middle part, and may be rotated relative to the outer mold part 12 in the described manner. Thereby, it is ensured by the stationary middle part that the opening through which the plastic is injected, does not rotate.

A bearing holder 11 with a bearing 10 is inserted into the end-side recess 8 on the inner mold part 2. One may recognize that a gap remains peripherally of the bearing holder 11 to the inner wall of the recess 8, and this gap is later filled with plastic, so that the bearing holder 11 is peripherally closed by plastic.

FIG. 5a schematically shows the inner mold part 2 with the inserted bearing 10 corresponding to the representation in FIG. 1d. The corresponding description is referred to. Furthermore, the outer ply 38 with the opening 44 is shown on the right in FIG. 5a. This ply is placed onto the inner mold part 2. Subsequently, the outer mold part 12 is placed onto the inner mold part 2, as is shown in FIG. 5b. The material of the outer ply 38 is an elastically extendible material. This may be achieved by a suitable elastic design of the individual fibers, from which the outer ply 38 is manufactured, or however also by a special design of the fabric of the outer ply 38. As may be recognized, the thickness of the outer ply 38 is smaller than the width of the gap 16. The ply 38 is applied into the gap 16, in a manner such that it does not bear on the inner wall of the recess 14 in the outer mold part 12, at least in sections, in particular in sections of the peripheral wall 30 of the can to be molded. Thus a gap 16b arises between the outer ply 38 and the outer mold part 12. Simultaneously, the outer ply 38 in the region of the peripheral wall however also does not bear on the wall of the inner mold part 2, so that a gap 16a is formed there. The outer ply 38, surrounding the opening of the injection channel 26, bears on the inner wall of the recess 14 only with the axial face-end, in which the opening 44 is arranged.

As may be further recognized in FIG. 5b, the peripheral region of the outer ply 38 is not designed in a completely cylindrical manner, but widens proceeding from the end-side 42 by an angle α towards the opposite axial end. By this, one succeeds in the outer ply 38 at the axial end facing the base plate 6, not bearing on the outer wall of the inner mold part 2. A bleeding through the annular gap 24 may thus be effected.

Figure 2:
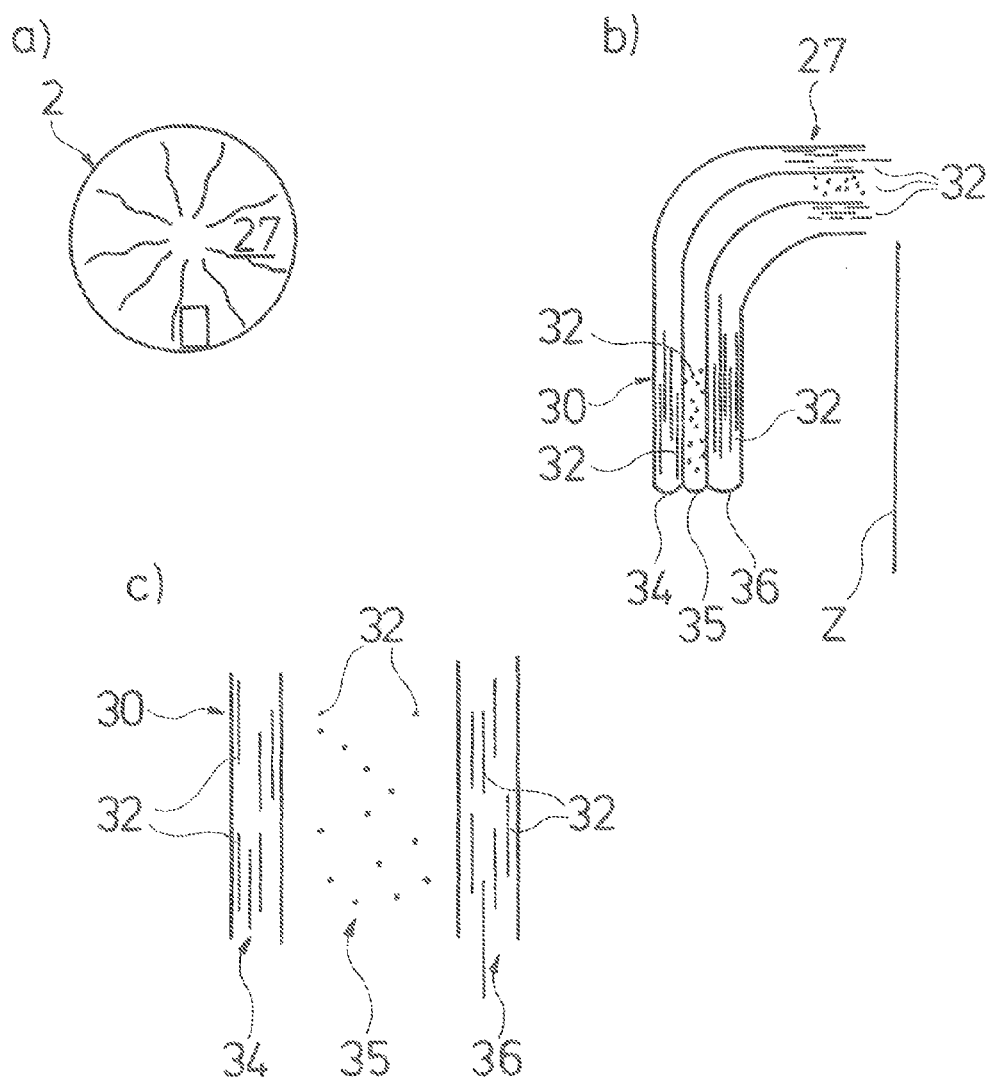
FIGS. 2a to 2c se schematic views of an alignment of the fibers in a can according to the invention.
Figure 6:
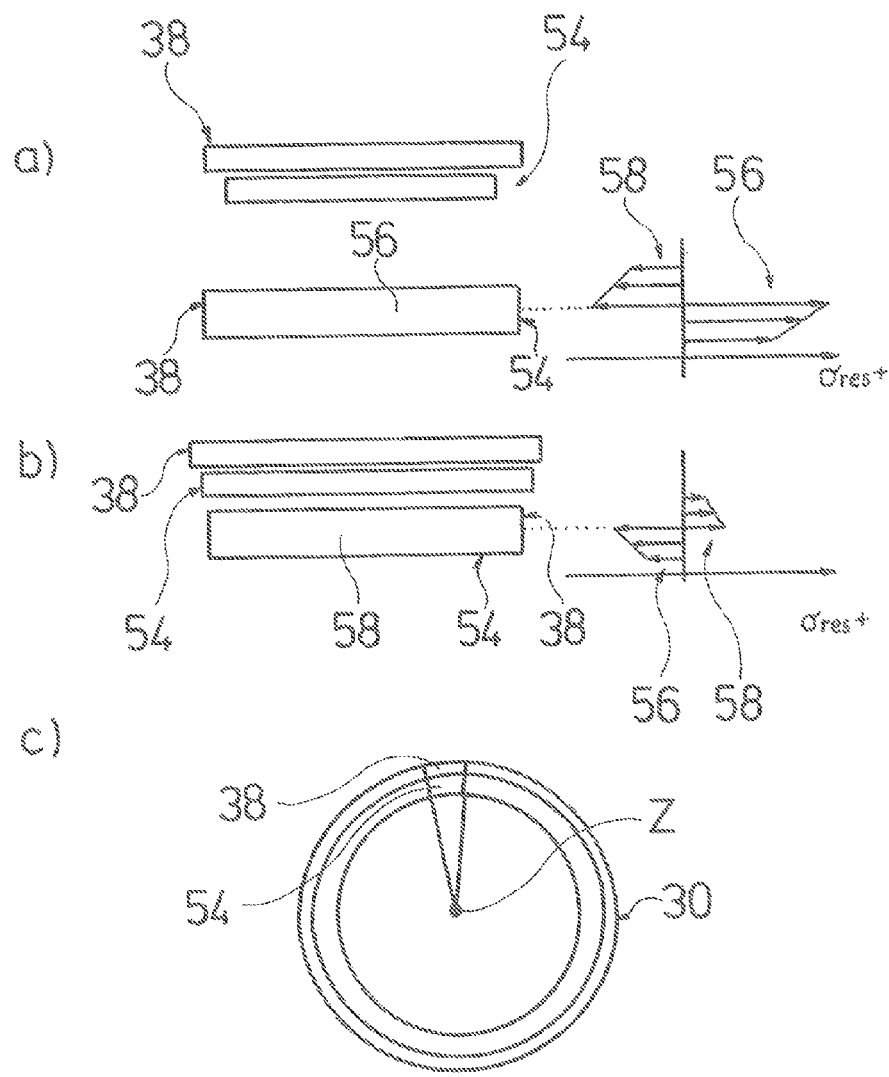
FIGS. 6a to 6c are diagrams showing the stress distribution in a can according to an embodiment of the invention.

As has already been explained by FIG. 1c, subsequently, as represented in FIG. 5c, fluid plastic is injected into the injection channel 26, and there flows through the opening 44 in the outer ply 38 into the gap 16a between the outer ply 38 and the inner mold part 2. The outer ply 38 is extended by this, whereby the gap 16a is increased in size, and the gap 16b disappears, i.e. the outer ply 38 comes to bear directly on the inner wall of the recess 14 in the outer mold part 12. Thereby, the outer ply 38 is extended in particular in the peripheral direction with respect to the longitudinal axis Z. The collar 50 of the outer ply 38, lies in the gap 18 between the base plate 6 and the outer mold part 2. The inner mold part 2 is rotated relative to the outer mold part 12 in the direction A about the longitudinal axis Z, as has been described by FIG. 1, during and/or after the injection of the plastic 52. The previously described alignment of the fibers 32 occurs by this, said fibers being admixed to the plastic 52. The outer ply 38 thereby is rotationally fixed to the outer mold part 12. Inasmuch as this is concerned, the inner mold part 2 also rotates relative to the outer ply 38. Thereby, the outer edge layer 34 described by FIG. 2 is preferably formed on the inner side of the outer ply 38. FIG. 5d shows the finished manufactured can 22 as described by FIGS. 5a to c. A special stress distribution, as explained by FIG. 6, is given in this can 22, in particular in the peripheral wall 30.

As is shown in FIG. 5d, the collar 20 comprises a collar part 53 which extends radially outwards in the radial direction beyond the extension of the outer ply 38 in the collar 20. This part is only injection molded by the plastic 52 of the inner ply. In order to achieve an adequate density of the material in this part of the collar 20, and in particular in order to avoid bubbles/blowholes on account of the shrinkage of the plastic 52 on solidification, a pressure in the direction of the outer mold part 12 is preferably exerted via the base plate 6, whereby the gap 18 is reduced in size.

As is shown schematically in FIG. 6c, the plastic 52 forms the inner ply 54 which bears on the inner wall of the outer ply 38. Both plies 38, 54 together form the peripheral wall 30 of the can 22.

A prestressing is achieved by the extending of the outer ply 38 on injecting the plastic 52. First, the situation without the extending of the outer ply 38, i.e. without prestressing, is observed by FIG. 6a. The outer ply 38 and the inner ply 54 which is formed of the plastic 52, are represented separately from one another at the top in FIG. 6a. One may recognize that the inner ply 54 has shrunk with respect to the outer ply 38 on solidification. If the outer ply 38 and the inner ply 54 are firmly connected to one another, as is shown at the bottom in FIG. 3a, 6a, this leads to the fact that, on account of the shrinkage of the inner ply 54, this ply is subjected to tensile stresses 56, and the outer ply 38 is subjected to compressive stresses 58. This leads to the fact that the outer 38 and the inner ply 54 connected to one another, tend to part or delaminate from one another.

FIG. 6b now shows the design according to the invention, according to which the outer ply 38 is designed in an elastically expansible manner. First, the outer ply 38 and the inner ply 54 in the condition of not being connected to one another, are shown first in a schematic manner in FIG. 6b. The two plies 38, 54 are shown in the connected condition at the bottom in FIG. 6b. On injecting the plastic 52, the outer ply 38, as described above, is first elastically stretched or extended. Thereby, it is extended to a greater extent than the plastic 52 shrinks later on solidification. If the plastic 52 now solidifies and shrinks, this leads to the fact that the outer ply 38 retains a certain extension and thus retains a certain prestressing. As a whole, by this, one succeeds in the outer ply 38 being subjected to tensile stresses 56 in the solidified condition, whilst the inner ply 54 is subjected to compression stresses 58 in the solidified condition. The effect of these stresses is that the outer ply 38 and the inner ply 54 are pressed against one another in the radial direction with respect to the longitudinal axis Z, and are held in the connected condition. Furthermore, the tensile stresses 56 in the outer ply 4 may counteract pressures occurring in the inside of the can 22. An increased stability of the can 22 is achieved in this manner, whereby the wall thickness may be kept small. Furthermore, the tensile stresses 56 in the outer ply 38 counteract a fracture formation in the inner ply 54, whereby one may achieve an increased sealing of the can.

Figure 7:
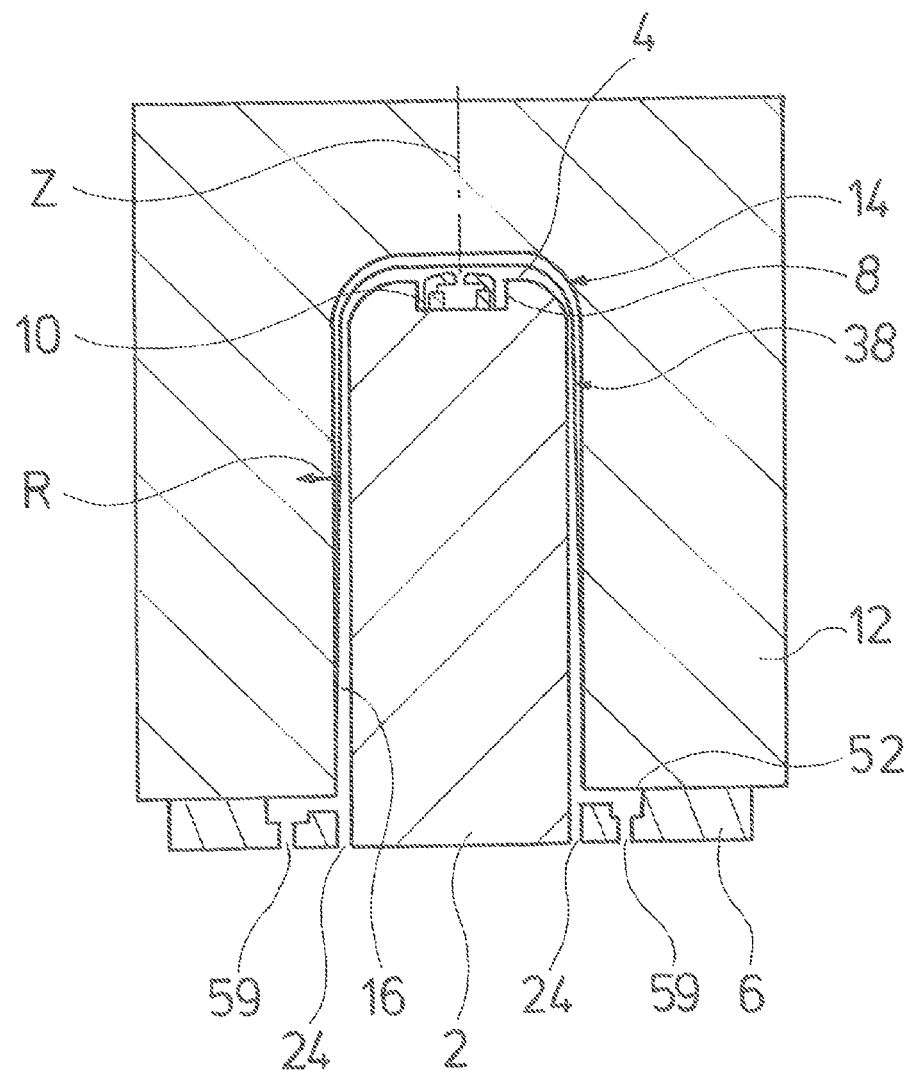
FIG. 7 is schematic cross-sectional view of the injection molding procedure of a can, according to a further embodiment of the invention.

In the example according to FIG. 5, the plastic was injected through the injection channel 52 which lies opposite the closed face-end or the base 27 of the can to be manufactured. FIG. 7 now schematically shows an embodiment, with which the fluid plastic 52 is injected from the opposite end. In the representation according to FIG. 7, the outer ply 38 is inserted into the gap 16 between the outer mold part and the inner mold part 2 according to the description with regard to FIG. 5d. The outer ply 38 however has no opening 44, and the plastic is injected through openings 59 from the axial end, i.e. proceeding from the open face-end 29 of the can 22 which is to be cast. Thereby, the plastic flows in the axial direction, i.e. parallel to the longitudinal axis Z through the gap 16 to the base of the can to be molded, i.e. towards the base of the recess 14 of the outer mold part 12. The outer ply 38 also undergoes an extension in the axial direction, i.e. in the direction of the longitudinal axis Z by this. For this, the outer ply 38 in its initial position is arranged in the gap 16 such that it does not bear on the wall of the recess 14, also at the base of the recess 14, i.e. opposite the axial end-side 4 of the inner mold part 2. The outer ply 38 is then also extended in the axial direction by the inflowing plastic 52, so that this ply also comes to bear on the base of the recess 14. A prestressing may also be achieved in the axial direction in this manner. The inner mold part 2 is rotated for orientating the fibers in the plastic 52, in the manner described by the other Figs.

Figure 8:
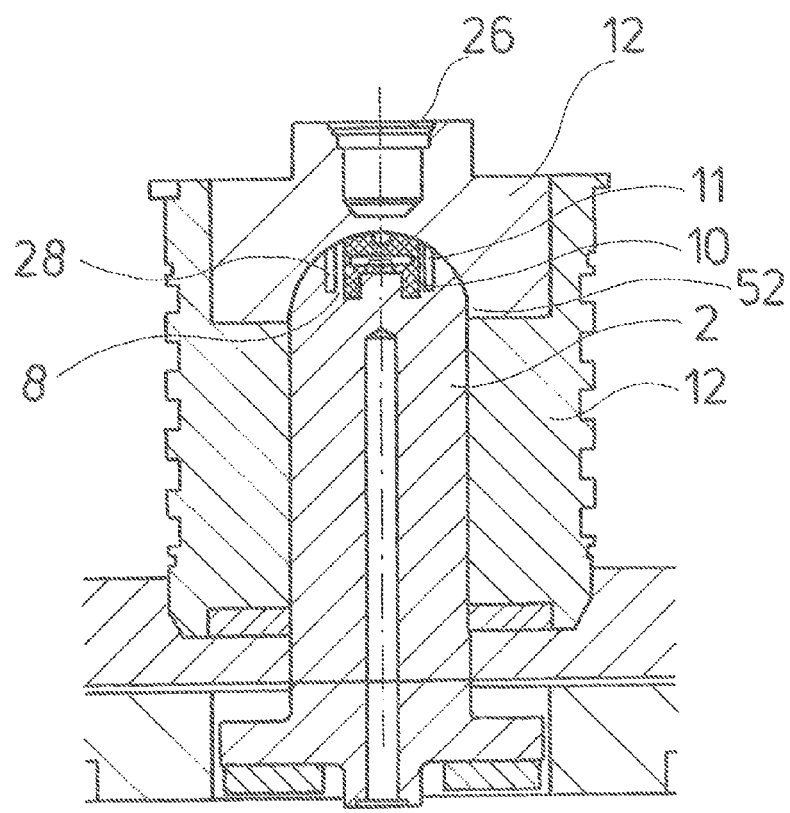
FIG. 8 is schematic cross-sectional view of an injection molding tool for a can, according to a further embodiment of the invention.

FIG. 8 shows an injection molding tool consisting of an inner mold part 2 and an outer mold part 12 with plastic 52 already injected, which forms a can 22. The embodiment corresponds essentially to that embodiment described by FIGS. 1c and d, as well as FIG. 4, so that the description with respect to this is omitted. In contrast to the embodiment according to FIG. 4, no outer ply 38 is provided with the embodiment according to FIG. 8. Inasmuch as this is concerned, here the method corresponds to that explained by FIG. 1. In contrast to FIG. 1 however, here the bearing 10 is not arranged directly in the plastic 52, but in a surrounding bearing holder 11, around which the plastic 52 flows. When the bearing holder 11 with the bearing 10 is inserted into the recess 8 of the inner mold part 2, a gap which defines the ring 28 of plastic remains between the peripheral wall of the recess 8 and the outer wall of the bearing 10 or the bearing holder 11, in order to form this ring 28 of plastic, as has been described by FIG. 1d.

Figure 9:
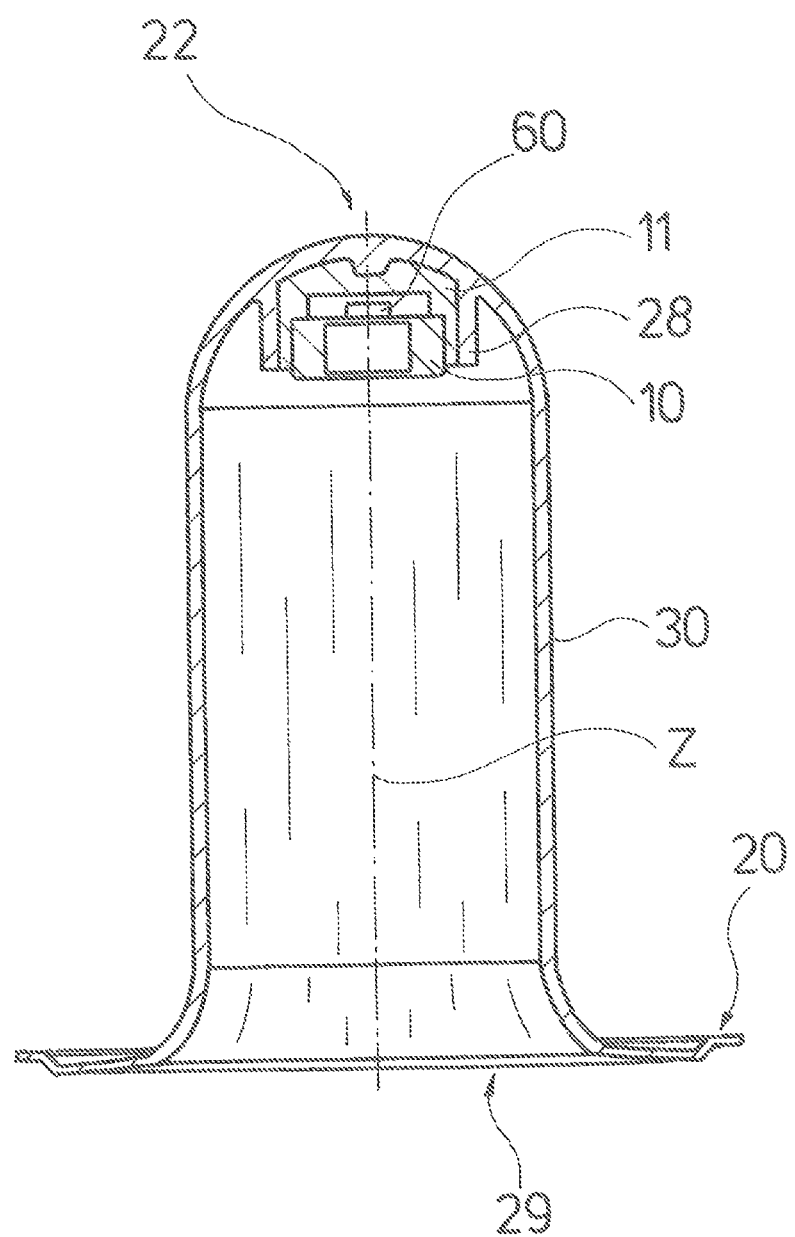
FIG. 9 is a sectional view of a can manufactured in the injection molding tool according to FIG. 8.

FIG. 9 shows the can manufactured according to FIG. 8. This can 22 corresponds essentially to that can shown in FIG. 1, with the difference that the bearing 10 is not cast in a direct manner, but is surrounded by a bearing holder 11. Grooves 60 extending axially parallel to the longitudinal axis Z are distributed over the periphery in the bearing holder 11, and these ensure that the bearing 10 may be peripherally flushed by the fluid in the inside of the can 22 through the grooves 60. Thus, the fluid may later penetrate into the free space between the bearing 10 and the bearing holder 11. This ensures an improved cooling of the bearing, and further that the bearing 10 and bearing holder 11 are kept where possible at the same temperature level, in order to avoid thermal stresses.

Figure 10:
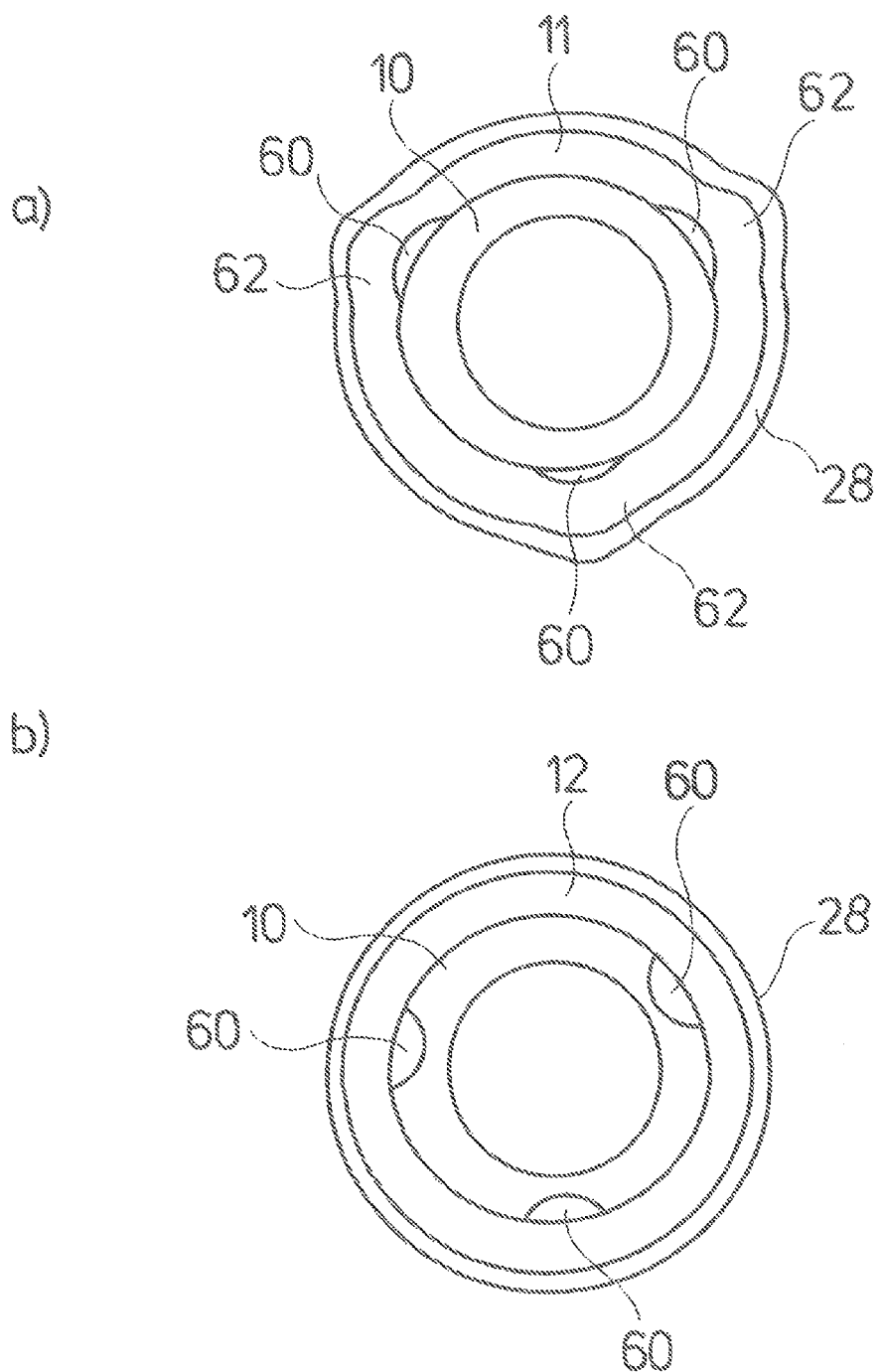
FIGS. 10a and 10b are designs of a bearing holder with a bearing.

The design of these grooves is explained in more detail by FIG. 10a. With the embodiment according to FIG. 10a, the bearing holder 11 which is designed in an essentially annular manner, comprises three protuberances 62, by which the three grooves 60 are formed on its outer periphery. The inserted bearing 10 is formed in a cylindrical manner on its outer contour, so that free spaces between the bearing holder and the bearing 10 arise at the grooves 60.

FIG. 10b shows a second embodiment with which the grooves 60 are not formed on the inner periphery of the bearing holder 11, but on the outer periphery of the bearing 10.

Figure 11:
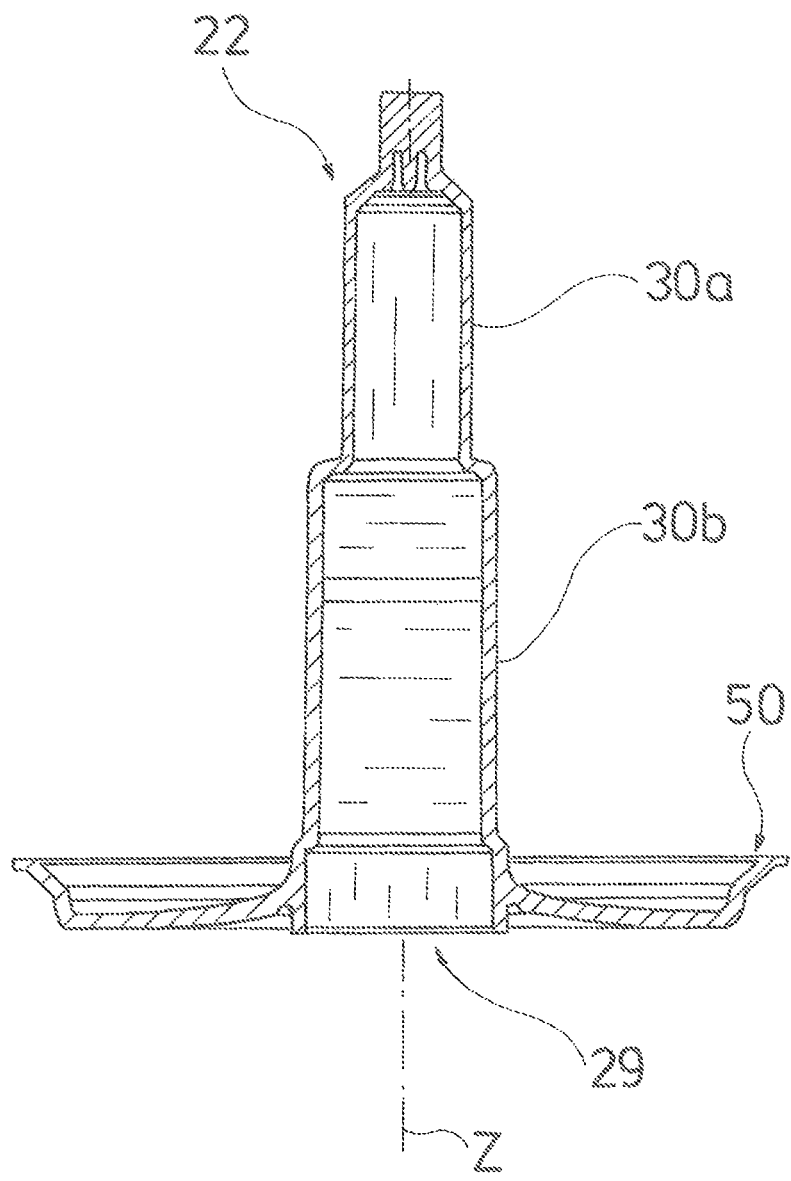
FIG. 11 is a sectional view of a can manufactured according to the invention.

FIG. 11 shows a sectioned view of a can designed according to the invention. The can 22 according to FIG. 11, with respect to the previously described orientation of the fibers 32 in its inside, corresponds to the preceding description. The can according to FIG. 11 is not designed with a constant diameter, in contrast to the previously described cans. It comprises two sections 30a and 30b of the peripheral wall which are arranged lying behind one another in the direction of the longitudinal axis Z. The diameter as well as the wall thickness are designed smaller in the section 30a than in the section 30b. This is achieved by designing the gap 16 between the inner mold part 2 and the outer mold part 12 accordingly differently wide, or in a stepped manner.

Figure 12:
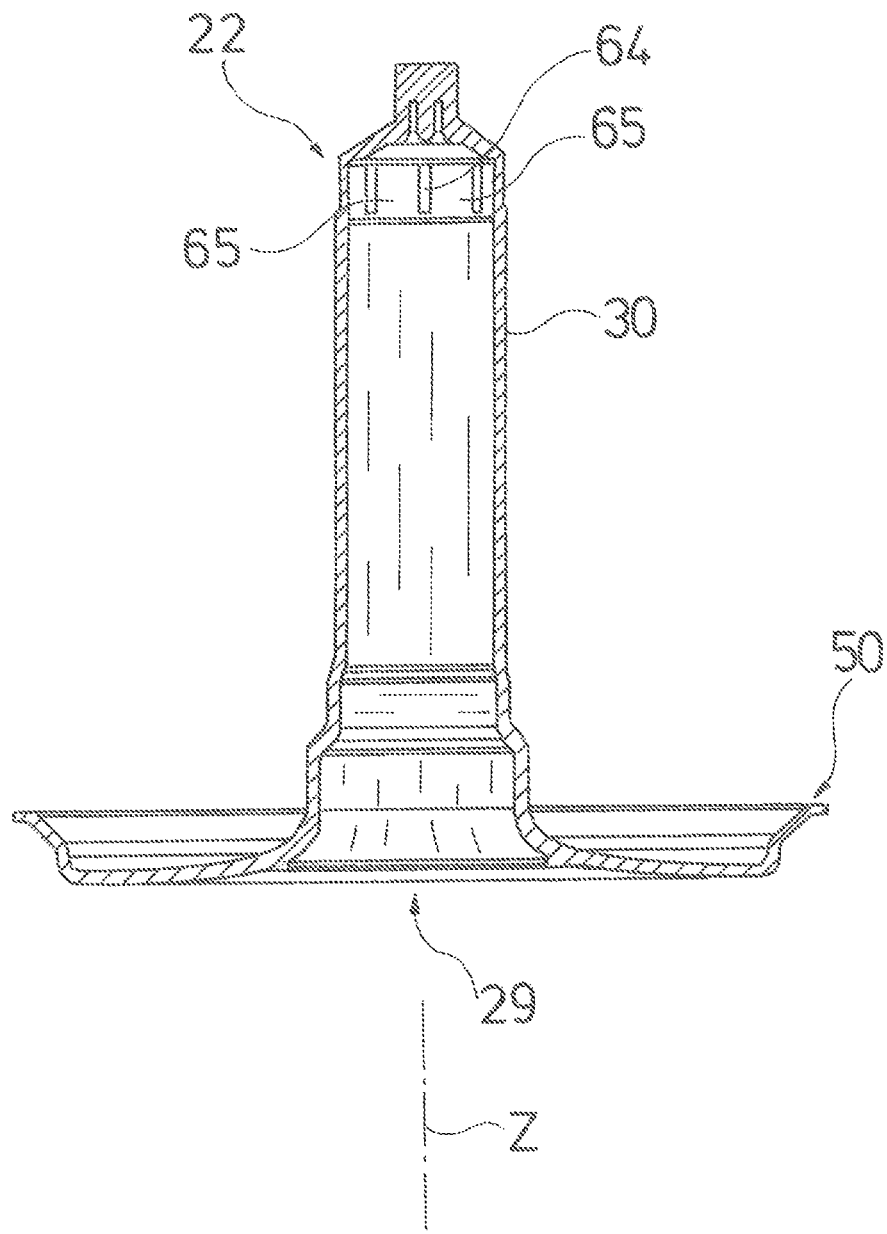
FIG. 12 is a sectional view of a can according to a further embodiment of the invention.

FIG. 12 shows a further embodiment example of a can 22 according to the invention, wherein, here too, the orientation of the fibers corresponds to the preceding description. The can shown in FIG. 12 does not comprise a bearing which is cast in. Projections 64 extending parallel to the longitudinal axis Z, distributed over the inner periphery, are formed in the can 22 in the section which is distant to the open end 29, and later come to bear on the outer wall of the bearing 10. This means that the bearing is fixed and centred between the projections 64, preferably with a non-positive fit. Thereby, free spaces 65 remain in the peripheral direction between the projections 64, and these have the same function as the previously described grooves 60.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for manufacturing a can of a drive motor for a pump assembly, the can having a closed end, the method comprising the steps of:
   admixing individual fibers (32) with fluid plastic (52) for reinforcement,
   introducing the admixture into an injection channel of an injection molding tool defining a shape of the can (22) to be manufactured to mold a peripheral wall (30) of the can (22), the injection channel being centrally located in an axial end of the injection molding tool which corresponds to the closed end of the can, the can (22) having a longitudinal axis (Z) and the peripheral wall (30) having at least three layers, the at least three layers including a middle layer and two outer layers, and
   rotating an inner mold part (2) of the injection molding tool relative to an outer mold part (12) of the injection molding tool during and/or after the introducing step,
   wherein, after the rotating step, the admixed individual fibers (32) in the middle layer of the peripheral wall (30) are oriented in a circumferential direction with respect to the longitudinal axis (Z) and the admixed individual fibers (32) in the two outer layers of the peripheral wall (30) are oriented in an axial direction with respect to the longitudinal axis (Z).

2. The method according to claim 1, wherein the fluid plastic (52) flows in an axial direction parallel to the longitudinal axis (Z) of the can (22) into a part of the injection molding tool which molds the peripheral wall (30) of the can (22).

3. The method according to claim 1, wherein a bearing (10) or a bearing holder (11) is applied into the injection molding tool in a defined position before the fluid plastic (52) is introduced into the injection molding tool.

4. The method according to claim 3, wherein the bearing (10) or the bearing holder (11) is applied into a recess (8) in the injection molding tool.

5. The method according to claim 4, wherein the bearing (10) or the bearing holder (11) is applied into a recess (8) on the inner mold part (2), and is held there, during the introduction of the fluid plastic (52), bearing on at least one surface of the inner mold part (2) by pressure of the plastic (52).

6. The method according to claim 3, wherein before insertion into the injection molding tool, a macro-structuring and/or micro-structuring is formed on at least one surface of the bearing (10) or the bearing holder (11), the at least one surface being envisaged to come into contact with the plastic (52).

7. The method according to claim 6, wherein the structuring is incorporated into the surface by laser beam or electrode beam.

8. The method according to claim 1, wherein a pre-manufactured material ply (38) is applied into the injection molding tool before the introduction of the fluid plastic (52), wherein the fluid plastic (52) is subsequently introduced between the inner mold part (2) of the injection molding tool and the pre-manufactured material ply (38).

9. The method according to claim 8, wherein the pre-manufactured material ply (38) is elastically extendible and is extended on introduction of the plastic (52).

10. The method according to claim 1, wherein at least one part of the injection molding tool is heated.

11. The method according to claim 1, wherein the injection molding tool comprises a gap (18) designed for forming a radially extending collar (20) at an open end of the can (22) to be manufactured, and wherein, during solidification of the plastic (52), a pressure is exerted onto at least one of the walls of the injection molding tool defining the gap (18), the pressure being directed towards an opposite wall.

12. The method according to claim 1, wherein the inner mold part (2) is rotated about the longitudinal axis (Z) of the inner mold part (2).

13. The method according to claim 3, wherein the bearing (10) or the bearing holder (11) is applied into a recess (8) on the inner mold part (2) of the injection molding tool.

* * * * *